United States Patent
Sakata

(10) Patent No.: US 11,478,800 B2
(45) Date of Patent: Oct. 25, 2022

(54) DRY GRINDING MACHINE

(71) Applicant: T-Fourth Co., Ltd., Tokyo (JP)

(72) Inventor: Koji Sakata, Tokyo (JP)

(73) Assignee: T-Fourth Co., Ltd., Tokyo (JP)

( * ) Notice: Subject to any disclaimer, the term of this patent is extended or adjusted under 35 U.S.C. 154(b) by 28 days.

(21) Appl. No.: 16/991,049

(22) Filed: Aug. 12, 2020

(65) Prior Publication Data

US 2020/0368753 A1 Nov. 26, 2020

Related U.S. Application Data

(63) Continuation of application No. PCT/JP2019/005126, filed on Feb. 13, 2019.

(30) Foreign Application Priority Data

Feb. 13, 2018 (JP) .............................. JP2018-022907
Jan. 18, 2019 (JP) .............................. JP2019-007353

(51) Int. Cl.
*B02C 18/00* (2006.01)
*B02C 18/22* (2006.01)
*B02C 18/08* (2006.01)

(52) U.S. Cl.
CPC .......... *B02C 18/2216* (2013.01); *B02C 18/08* (2013.01)

(58) Field of Classification Search
CPC ....... B02C 18/06; B02C 18/08; B02C 18/182; B02C 18/162; B02C 18/062;
(Continued)

(56) References Cited

U.S. PATENT DOCUMENTS 1,758,010 A * 5/1930 Pettinos ................. B02C 13/14
   241/185.5
1,788,683 A * 1/1931 Bramley-Moore ...... A23N 5/00
   241/58
(Continued)

FOREIGN PATENT DOCUMENTS

CN       2184484 Y       12/1994
GB       351281 A *      6/1931      ........... B02C 13/282
(Continued)

OTHER PUBLICATIONS

In Seong Choi, Soybean waste (okara) as a valorization biomass for the bioethanol production, Dec. 15, 2015, ScienceDirect (Year: 2015).*

(Continued)

*Primary Examiner* — Faye Francis

(57) ABSTRACT

To improve operating efficiency of a dry grinding machine, the dry grinding machine includes a rotating shaft; a first blade that is rotationally driven by the rotating shaft; a grinding chamber that houses the first blade; a feed-in section that feeds material to be processed, which is transported by hot air into the grinding chamber from a direction intersecting the rotating shaft; and a discharging section that is arranged on a side of the first blade opposite the feed-in section, in an axial direction of the rotating shaft, and discharges from the grinding chamber, along with the hot air, the material to be processed that has been ground by the first blade while being dried by the hot air fed in from the feed-in section.

16 Claims, 6 Drawing Sheets

(58) Field of Classification Search
CPC ............ B02C 18/145; B02C 2018/162; B02C 2018/147; B02C 23/18; B02C 23/24; B02C 13/2266; B02C 13/08; B02C 13/14; B02C 13/16; B02C 13/30; B02C 13/28
See application file for complete search history.

(56) References Cited

U.S. PATENT DOCUMENTS

| | | | | |
|---|---|---|---|---|
| 1,927,277 A | * | 9/1933 | Canary | B02C 13/1814 241/154 |
| 1,967,323 A | * | 7/1934 | Pettibone | B02C 13/00 241/154 |
| 2,838,246 A | * | 6/1958 | Stefano | B02C 13/26 125/24 |
| 6,360,975 B1 | * | 3/2002 | Csendes | B01D 53/00 241/19 |
| 6,397,490 B1 | | 6/2002 | Inoki | |
| 8,777,142 B2 | * | 7/2014 | Gronholz | B02C 13/282 241/188.1 |
| 2008/0245913 A1 | * | 10/2008 | Waznys | B02C 13/282 241/188.1 |
| 2010/0108791 A1 | | 5/2010 | Hasegawa | |
| 2011/0186664 A1 | * | 8/2011 | Lucas | B02C 13/13 241/38 |
| 2020/0129986 A1 | * | 4/2020 | Gronholz | B02C 13/16 |

FOREIGN PATENT DOCUMENTS

| | | | |
|---|---|---|---|
| JP | 2000126640 A | | 5/2000 |
| JP | 2001041652 A | | 2/2001 |
| JP | 2001133150 A | | 5/2001 |
| JP | 2001321684 A | | 11/2001 |
| JP | 2011085340 A | | 4/2011 |
| JP | 2012187524 A | * | 10/2012 |
| JP | 2012187524 A | | 10/2012 |
| JP | 2013174405 A | | 9/2013 |
| JP | 2016165231 A | | 9/2016 |
| WO | 2008093839 A1 | | 8/2008 |

OTHER PUBLICATIONS

International Preliminary Report on Patentability for International Application No. PCT/JP2019/005126, issued by the International Bureau of WIPO dated Aug. 18, 2020.

Decision to Grant a Patent issued for counterpart Japanese Application No. 2019-007353, issued by the Japanese Patent Office dated May 7, 2019 (drafted on Apr. 22, 2019).

* cited by examiner

DRY GRINDING MACHINE

The contents of the following Japanese and International patent applications are incorporated herein by reference:
Appln. No. 2018-022907 filed in JP on Feb. 13, 2018,
Appln. No. 2019-007353 filed in JP on Jan. 18, 2019, and
Appln. No. PCT/JP2019/005126 filed in WO on Feb. 13, 2019.

TECHNICAL FIELD

The present invention relates to a dry grinding machine.

BACKGROUND ART

A dry grinding machine is known that manufactures dry powder from a material to be processed containing moisture, as shown in Patent Document 1, for example

CITATION LIST

Patent Literature

[PTL 1] Japanese Patent Application Publication No. 2013-174405

GENERAL DISCLOSURE

In the dry grinding machine described above, the rotating shaft supporting the blade holds the blade on one side, and therefore the axial length is limited, and it is difficult to improve the processing capability by enlarging the volume of the grinding chamber. One aspect of the present invention may be the dry grinding machine described below. The dry grinding machine may include a rotating shaft. The dry grinding machine may include a first blade that is rotationally driven by the rotating shaft. The dry grinding machine may include a grinding chamber that houses the first blade. The dry grinding machine may include a feed-in section that feeds material to be processed, which is transported by hot air, into the grinding chamber from a direction intersecting the rotating shaft. The dry grinding machine may include a discharging section that is arranged on a side of the first blade opposite the feed-in section, in an axial direction of the rotating shaft, and discharges from the grinding chamber, along with the hot air, the material to be processed that has been fed in from the feed-in section and then ground by the first blade while being dried by the hot air. The grinding chamber may have a rotating body shape centered on the rotating shaft. The grinding chamber may have a portion where an inner diameter becomes larger closer to the discharging section in the axial direction, at least on the discharging section side of the first blade.

A position of the rotating shaft relative the grinding chamber is fixed in the axial direction, at both ends of the grinding chamber. The grinding chamber may include a portion where an inner diameter is constant, in the axial direction, at each end in the axial direction. The dry grinding machine may further include a second blade arranged on a side of the feed-in section opposite the first blade, in the axial direction. A space between the second blade and the grinding chamber may be sealed by high-pressure air whose pressure is higher than atmospheric pressure. A ratio of surface area of one side of a blade to a cross section of the grinding chamber including the second blade may be greater for the second blade than for the other blade. The dry grinding machine may further include a blowing section that is arranged on a side of the feed-in section opposite the first blade, in the axial direction, and blows hot air into the grinding chamber. The blowing section may blow the hot air along a line tangent to the grinding chamber in a cross section orthogonal to the rotating shaft of the grinding chamber. The dry grinding machine may further include a third blade arranged between the feed-in section and the blowing section, in the axial direction. The third blade may be arranged downstream from the feed-in section in a direction of gravity. The dry grinding machine may further include a second blade arranged on a side of the blowing section opposite the third blade, in the axial direction. A space between the second blade and the grinding chamber may be sealed by high-pressure air whose pressure is higher than atmospheric pressure. A ratio of surface area of one side of a blade to a cross section of the grinding chamber including the second blade may be greater for the second blade than for other blades. The dry grinding machine may further include a fourth blade arranged between the first blade and the discharging section, in the axial direction. The material to be processed may be a food product. The material to be processed may be any one of biomass fuel and a hydrous solid fuel including lignite.

The summary clause does not necessarily describe all necessary features of the embodiments of the present invention. The present invention may also be a sub-combination of the features described above.

DESCRIPTION OF EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
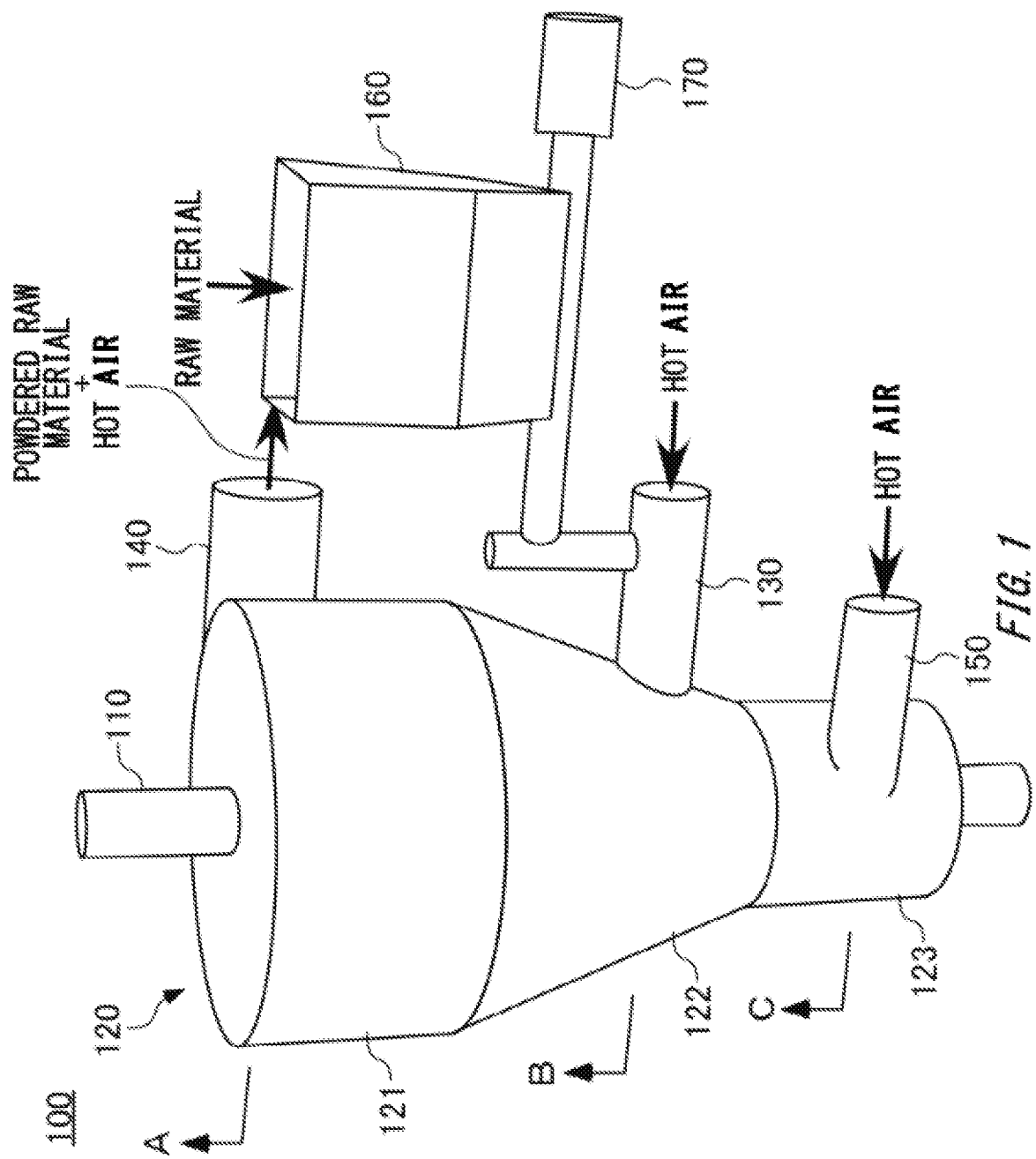
FIG. 1 is a perspective view schematically showing the outside of the dry grinding machine 100.

FIG. 1 is a perspective view schematically showing the dry grinding machine 100. The dry grinding machine 100 includes a rotating shaft 110, a grinding chamber 120, a feed-in section 130, a discharging section 140, and a blowing section 150.

The grinding chamber 120 includes an upper portion 121, a tapered portion 122, and a lower portion 123, which are connected vertically in the drawing, and has a rotational body shape with the rotating shaft 110 as a central axis. The upper portion 121 and the lower portion 123 arranged at the ends of the grinding chamber 120 in the axial direction each have a cylindrical shape with a constant inner diameter in the axial direction.

Furthermore, the upper portion 121 has a greater diameter than the lower portion 123. The tapered portion 122 has a truncated cone shape whose diameter increases toward the top in the drawing, in order to connect the upper portion 121 and the lower portion 123. The grinding chamber 120 is formed with a board member, and has therein a cavity with a shape substantially the same as the outer shape thereof, as described further below in reference to FIG. 6.

The rotating shaft 110 penetrates vertically in the drawing through the center of the grinding chamber 120, and is supported near the ends thereof in a rotatable manner by the top end and bottom end of the grinding chamber 120. The rotating shaft 110 is rotationally driven by a drive section, not shown in the drawings.

The feed-in section 130 has a tube shape, and is provided protruding substantially horizontally from a side surface of the tapered portion 122 of the grinding chamber 120. The feed-in section 130 is connected to a hot air supply source, and is also connected to a hopper 160 and a feeder 170. The hopper 160 has a funnel-shaped opening into which the material to be processed is fed from the outside. The feeder 170 pushes a material to be processed, which is fed into the hopper 160, to the feed-in section 130. In this way, the material to be processed that has been transported by hot air is fed into the grinding chamber 120 from the feed-in section 130 in a direction intersecting the rotating shaft 110.

The discharging section 140 has a tube shape, and is provided protruding in a direction tangential to a horizontal cross section of the upper portion 121 from a side surface of the upper portion 121 of the grinding chamber 120. When the material to be processed fed from the feed-in section 130 is dried and ground into powder inside the grinding chamber 120, this powder is discharged to the outside from the grinding chamber 120 along with the hot air, through the discharging section 140.

The blowing section 150 has a tube shape, and is provided protruding in a direction tangential to a horizontal cross section of the lower portion 123, from a side surface of the lower portion 123 of the grinding chamber 120. The blowing section 150 blows hot air into the lower portion 123 of the grinding chamber 120.

In the example described above, the feed-in section 130, the discharging section 140, and the blowing section 150 each have circular cross-sectional shapes. However, the cross-sectional shapes of the feed-in section 130, the discharging section 140, and the blowing section 150 are not limited to being circular, and may be other shapes such as elliptical or rectangular. In particular, from the viewpoint of causing the hot air to flow efficiently, the discharging section 140 and the blowing section 150 may be formed by ducts with rectangular cross sections. Furthermore, it is obvious that the routing paths of the feed-in section 130, the discharging section 140, and the blowing section 150 can be modified according to the layout or the like of the feeding equipment that feeds the material to be processed, the blower and heating apparatus that generate the hot air, or the like.

Figure 2:
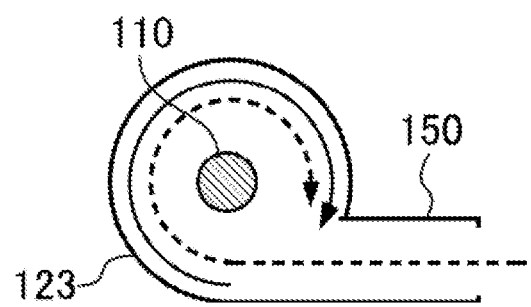
FIG. 2 is a horizontal cross-sectional view of the dry grinding machine 100.

FIG. 2 is a horizontal cross-sectional view of the dry grinding machine 100. FIG. 2 schematically shows the state of the dry grinding machine 100 cleaved in a horizontal plane including the blowing section 150 and orthogonal to the rotating shaft 110, as shown by the reference character C in FIG. 1, from an overhead view of the dry grinding machine 100 shown in FIG. 1.

As shown in the drawing, the blowing section 150 is provided tangent to the lower portion 123 of the grinding chamber 120, in the cross section of the grinding chamber 120 orthogonal to the rotating shaft 110, and blows the hot air along the inner surface of the grinding chamber 120. In this way, a swirling flow of the hot air is caused inside the lower portion 123 of the grinding chamber 120. Since the inner diameter of the grinding chamber 120 is relatively smaller in the lower portion 123, the hot air blown by the blowing section 150 swirls at a high speed.

As shown by the solid-line arrows in the drawing, the swirling direction of the hot air in the grinding chamber 120 matches the rotational direction of a first blade unit 210, a second blade unit 220, a third blade unit 230, and a fourth blade unit 240 (see FIG. 6) that are described further below, which is a clockwise rotation in the drawing in this example. The blowing section 150 is installed to extend in such a direction that the hot air blown into the grinding chamber 120 through the blowing section 150 does not oppose the swirling of the hot air within the grinding chamber 120. Accordingly, in a case where the swirl direction of the hot air in the grinding chamber 120 is reversed, the position where the blowing section 150 is attached is also preferably changed.

Figure 3:
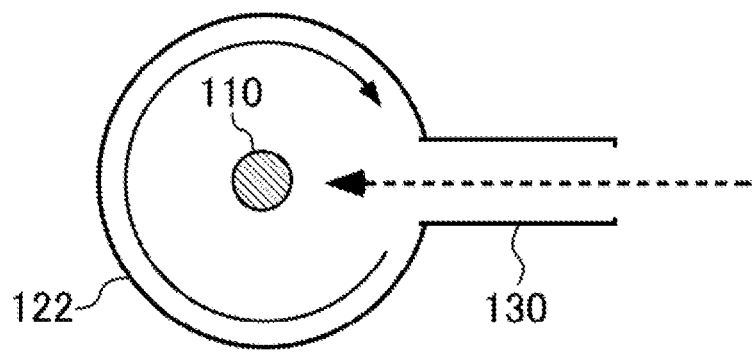
FIG. 3 is a horizontal cross-sectional view of the dry grinding machine 100.

FIG. 3 is a horizontal cross-sectional view of the dry grinding machine 100. FIG. 3 schematically shows the state of the dry grinding machine 100 cleaved in a horizontal plane including the feed-in section 130 and orthogonal to the rotating shaft 110, as shown by the reference character B in FIG. 1, from an overhead view of the dry grinding machine 100 shown in FIG. 1.

As shown in the drawing, the feed-in section 130 is provided along an extension line of a diameter of the tapered portion 122 of the grinding chamber 120, in a cross section of the grinding chamber 120 orthogonal to the rotating shaft 110, and blows the material to be processed and hot air toward the center of the grinding chamber 120. In this way, the fed material to be processed is distributed widely within the horizontal cross section of the grinding chamber 120.

The feed-in section 130 feeds the hot air and the material to be processed toward the rotating shaft 110. Therefore, a swirling flow in a prescribed direction along the inner wall of the grinding chamber 120 does not occur just due to the feed-in section 130 itself.

However, a swirling flow occurs inside the grinding chamber 120 due to the hot air blown in from the blowing section 150 shown in FIG. 2, and therefore the hot air blown in from the feed-in section 130 is wound up into the swirling flow caused in the lower portion 123 to become a swirling flow. Accordingly, the material to be processed transported in the hot air blown in from the feed-in section 130 also swirls along the inner wall of the grinding chamber 120 within the grinding chamber 120.

Figure 4:
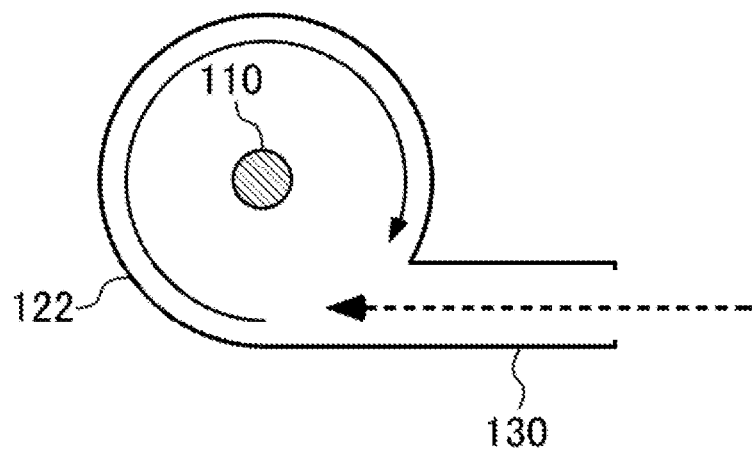
FIG. 4 is a horizontal cross-sectional view of the dry grinding machine 100.

FIG. 4 is a horizontal cross-sectional view of the dry grinding machine 100. FIG. 4 schematically shows the state of the dry grinding machine 100 cleaved in a horizontal plane at the position shown by the reference character B shown in FIG. 1, in the same manner as in FIG. 3, from an overhead view of the dry grinding machine 100. The cross section shown in FIG. 4 is a different embodiment from the cross section shown in FIG. 3.

As shown in the drawing, in this example, the feed-in section 130 is provided along a line tangent to a side wall of the grinding chamber 120. Here, the feed-in section 130 is installed to extend in such a direction that the material to be processed fed into the grinding chamber 120 through the feed-in section 130 does not oppose the swirling of the hot air within the grinding chamber 120. Therefore, the hot air transporting the material to be processed into the grinding chamber 120 through the feed-in section 130 quickly causes a swirling flow that swirls along the inner wall of the grinding chamber 120. It should be noted that, if the swirling direction of the hot air in the grinding chamber 120 is in the opposite direction, the position where the feed-in section 130 is attached is also preferably changed.

Figure 5:
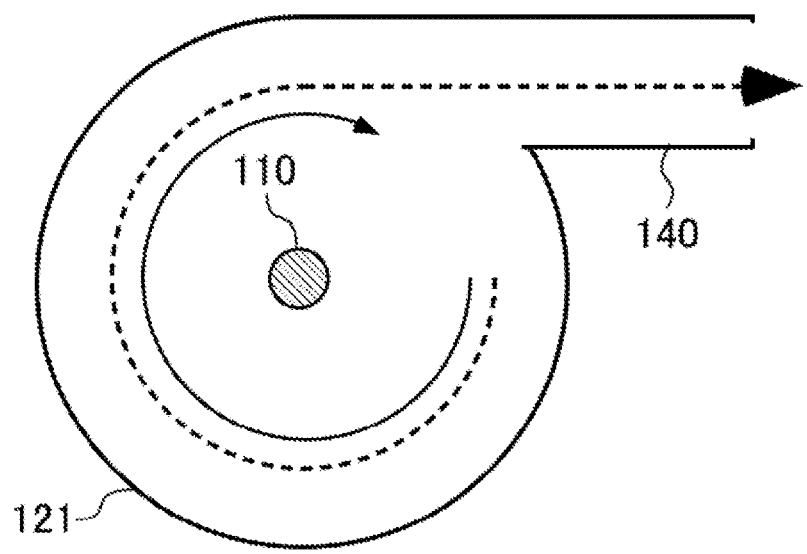
FIG. 5 is a horizontal cross-sectional view of the dry grinding machine 100.

FIG. 5 is a horizontal cross-sectional view of the dry grinding machine 100. FIG. 5 schematically shows the state of the dry grinding machine 100 cleaved in a horizontal plane including the discharging section 140 and orthogonal to the rotating shaft 110, as shown by the reference character A in FIG. 1, from an overhead view of the dry grinding machine 100 shown in FIG. 1.

As shown in the drawing, the discharging section 140 is provided along a line tangent to the upper portion 121 of the grinding chamber 120, in a cross section of the grinding chamber 120 orthogonal to the rotating shaft 110. Here, the discharging section 140 is installed with such an orientation that the ground material to be processed is sent out from the grinding chamber 120 by the swirl of the hot air within the grinding chamber 120. Therefore, the hot air creating the swirling flow that rotates along the inner surface of the grinding chamber 120 and the powder transported in this swirling flow is discharged to the outside of the grinding chamber 120 through the discharging section 140. The dried powder that is discharged to the outside of the grinding chamber 120 along with the hot air is cooled and collected using a classifier or the like, thereby obtaining the dry powder of the material to be processed fed thereto. In a case where the swirl direction of the hot air in the grinding chamber 120 is reversed, the position where the discharging section 140 is attached is also preferably changed.

Figure 6:
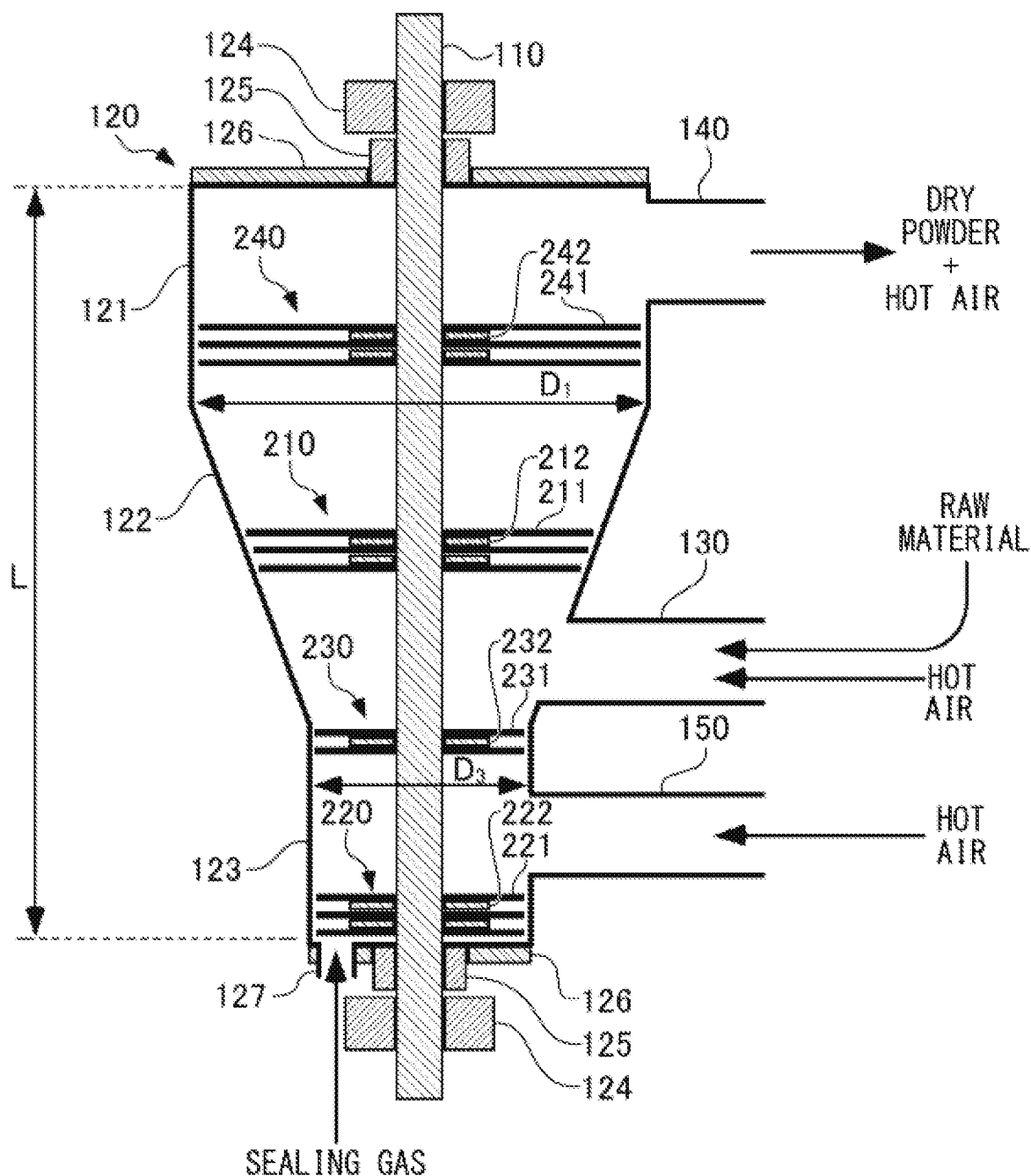
FIG. 6 is a cross-sectional view of the internal structure of the dry grinding machine 100.

FIG. 6 is a schematic cross-sectional view of the structure for grinding the material to be processed fed thereto to create powder, inside the dry grinding machine 100. The first blade unit 210, the second blade unit 220, the third blade unit 230, and the fourth blade unit 240 are housed inside the grinding chamber 120. The first blade unit 210, the second blade unit 220, the third blade unit 230, and the fourth blade unit 240 are rotationally driven by the rotating shaft 110 to rotate together with the rotating shaft 110.

The rotating shaft 110 penetrates vertically in the drawing through the entire grinding chamber 120, and is rotatably supported at both ends thereof outside of the grinding chamber 120, by a pair of bearings 124 arranged at the top end and the bottom end thereof in the drawing. In this way, the position of the rotating shaft 110 relative the grinding chamber 120 is fixed in the axial direction, at both ends of the grinding chamber 120.

The rotating shaft 110 is rotationally driven by a drive apparatus (not shown in the drawings) arranged outside the grinding chamber 120. Furthermore, gaps between the rotating shaft 110 and the grinding chamber 120 are each sealed by a seal 125, to prevent the leakage of hot air along the rotating shaft 110 from inside the grinding chamber 120. Furthermore, the top surface and bottom surface on the outside of the grinding chamber 120 are covered by a thermal insulation material 126, to prevent deterioration of the lubrication of the bearings 124 due to the radiant heat from the grinding chamber 120 heated by the hot air.

Inside the grinding chamber 120, the first blade unit 210 is attached to the rotating shaft 110, and rotates together with the rotating shaft 110 when the rotating shaft 110 is rotationally driven. The first blade unit 210 includes a plurality of blade plates 211 that are layered in the axial direction of the rotating shaft 110 in a manner to sandwich spacers 212.

Figure 7:
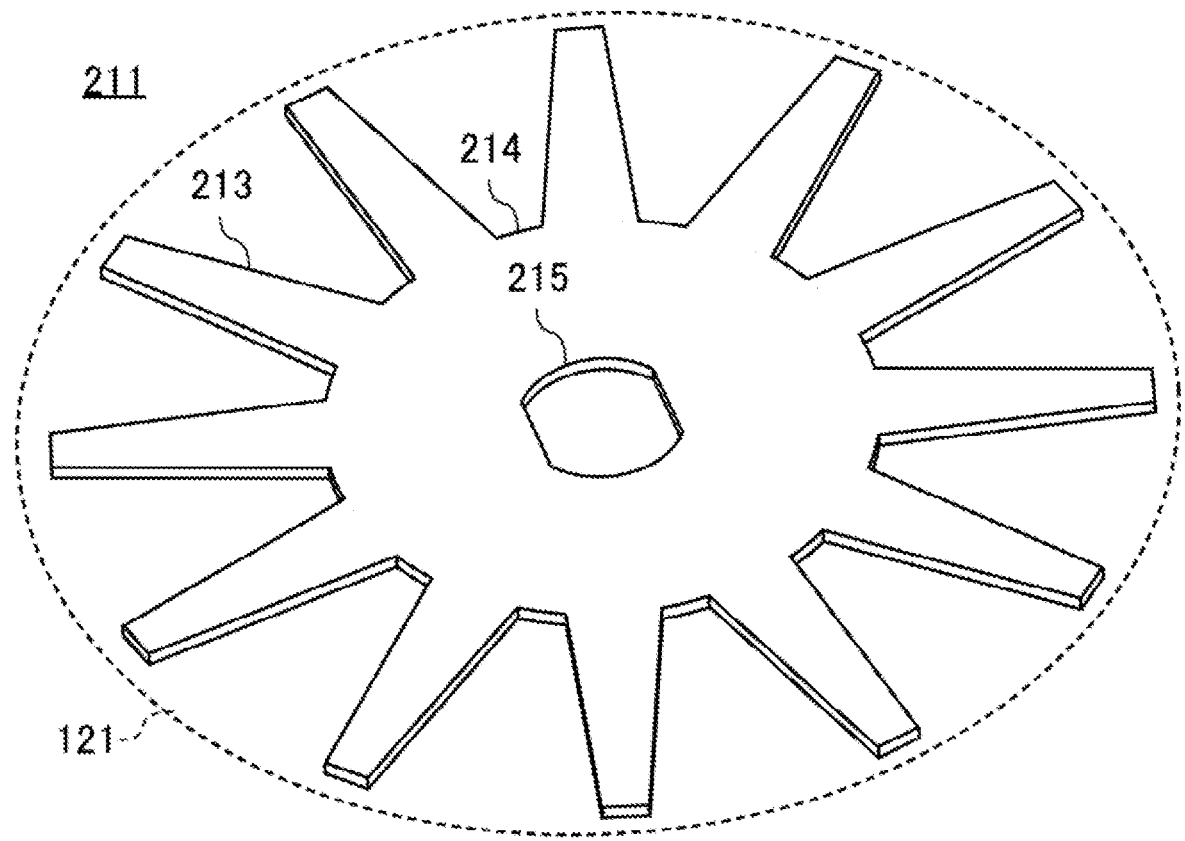
FIG. 7 is a perspective view of one blade plate 211.

FIG. 7 is a perspective view of the shape of one blade plate 211 of the first blade unit 210. Each blade plate 211 includes a plurality of blade fins 213 and a single disc portion 214.

In each blade plate 211, the plurality of blade fins 213 are arranged radially along the circumference of the disc-shaped disc portion 214. The disc portion 214 has a non-circular engagement hole 215 at the center thereof. In the example shown in FIG. 7, the engagement hole 215 is shaped as a circular hole partially cut off by parallel lines, such that a portion of the rotating shaft 110 having the same cross-sectional shape as the engagement hole 215 can be inserted therethrough to realize a state in which the rotating shaft 110 and the blade plate 211 do not rotate relative to each other. In this way, when the rotating shaft 110 is rotationally driven from the outside of the grinding chamber 120, it is possible for the blade plate 211 to be rotated together with the rotating shaft 110 inside the grinding chamber 120.

In the example shown in FIG. 7, the blade plate 211 includes 12 blade fins 213. However, the number of blade fins 213 in the blade plate 211 is not limited to 12, and this number can be changed to any number in a range from 8 to 16.

Furthermore, in general it is easier to make the material to be processed finer when the number of blade fins 213 is greater, but this makes the aperture ratio of the blade plate 211 smaller. Therefore, since the weight of the blade plate 211 is increased, a greater drive force is needed for the rotational drive. Furthermore, the airflow resistance occurring when the hot air transporting the material to be processed passes through the blade plate 211 increases and the power consumption of the blower equipment and the like also increases. Accordingly, the aperture ratio of the blade plate 211 may be set to 50% or greater.

With reference to FIG. 6 again, in the grinding chamber 120 of the dry grinding machine 100, the discharging section 140 is arranged on the side of the first blade unit 210 opposite the feed-in section 130, in the axial direction of the rotating shaft 110. In this way, the majority of the material to be processed fed into the grinding chamber 120 from the feed-in section 130 is ground by the rotating first blade unit 210 in the process where the material to be processed is transported toward the discharging section 140 by the hot air.

When the first blade unit 210 is rotating inside the grinding chamber 120, the material to be processed fed into the grinding chamber 120 and passing through the blade fins 213 is cut up by the blade fins 213 to increase the surface area thereof. In this way, the drying of the material to be processed by the hot air is encouraged and the material to be processed in a drier state is cut up by the blade fins 213, such that the material to be processed is efficiently dry-powdered. The discharging section 140 discharges the material to be processed, which has been fed from the feed-in section 130 and ground in the first blade unit 210 while being dried by the hot air to be dry-powdered, is discharged from the grinding chamber 120 along with the hot air.

The particle diameter of the material to be processed ground by the first blade unit 210 affects the particle diameter of the dry powder taken out from the discharging section 140. Therefore, the first blade unit 210 is preferably configured such that a gap between the inner surface of the grinding chamber 120 and the tip of each blade fin 213 of the first blade unit 210 becomes gradually narrower in a direction of the flow of the material to be processed. More specifically, in a case where the gap between the inner surface of the grinding chamber 120 and the tip of the blade fin 213 on the feed-in section 130 side in the first blade unit 210 is 5 mm, for example, the gap between the inner surface of the grinding chamber 120 and the tip of the blade fin 213 on the discharging section 140 side may be set to 3 mm.

Furthermore, the grinding chamber 120 of the dry grinding machine 100 includes a tapered portion 122 whose inner diameter becomes larger closer to the discharging section 140 in the axial direction rotating shaft 110, at least on the discharging section 140 side of the first blade unit 210. In this way, when the material to be processed that has been insufficiently dried and ground moves from the bottom to the top inside the grinding chamber 120 in the drawing due to the hot air, this material to be processed is restricted from becoming attached to the inside wall of the grinding chamber 120. Accordingly, in a case where the material to be processed including a large amount of water undergoes the dry grinding as well, the time during which continuous operation can be performed without cleaning the inside of the grinding chamber 120 increases.

In this case, the ratio of the inner diameter D1 of the upper portion 121 to the inner diameter D3 of the lower portion 123 in the grinding chamber 120 is preferably set to be from 1.25 to 2.5. Furthermore, the ratio of the length L of the grinding chamber 120 to the inner diameter D1 of the upper portion 121 is preferably set to be from 1.5 to 3.

In the grinding chamber 120, the blowing section 150 is arranged on the side of the feed-in section 130 opposite the first blade unit 210, in the axial direction of the rotating shaft 110. In this way, the material to be processed fed into the grinding chamber 120 from the feed-in section 130 is easily transported in the hot air blown into the grinding chamber 120 from the blowing section 150 to have a swirling flow.

Furthermore, the dry grinding machine 100 includes the third blade unit 230 attached to the rotating shaft 110. Here, the third blade unit 230 is arranged between the feed-in section 130 and the blowing section 150, in the axial direction of the rotating shaft 110. Accordingly, as shown in FIG. 6, in a case where the dry grinding machine 100 is installed vertically such that the rotating shaft 110 is also oriented vertically, the third blade unit 230 is arranged at the bottom side of the first blade unit 210 in the direction of gravity.

In the same manner as the first blade unit 210, the third blade unit 230 includes a plurality of blade plates 231 stacked and sandwiching spacers 232. The blade fins 213 of the blade plates 231 of the third blade unit 230 may have different lengths, widths, and the like than the blade fins of the blade plates 211 of the first blade unit 210, and the number of blade fins 213 may be different from the number of blade fins in the blade plates 211.

However, the blade plates 231 have a similar shape as in the blade plates 211 of the first blade unit 210, with regard to including a disc-shaped disc portion and having fins arranged radially along the outer circumference of the disc portion. Accordingly, when attached to the rotating shaft 110, the third blade unit 230 also rotates along with the rotating shaft 110 that is rotationally driven, to grind the material to be processed passing between the blade fins.

The dry grinding machine 100 further includes the second blade unit 220 attached to the rotating shaft 110. The second blade unit 220 includes a plurality of blade plates 221 stacked in the axial direction of the rotating shaft 110 and sandwiching spacers 222, and is arranged on a side of the blowing section 150 opposite the third blade unit 230 in this axial direction. Furthermore, the second blade unit 220 is arranged in the immediate vicinity of the floor surface of the grinding chamber 120.

Figure 8:
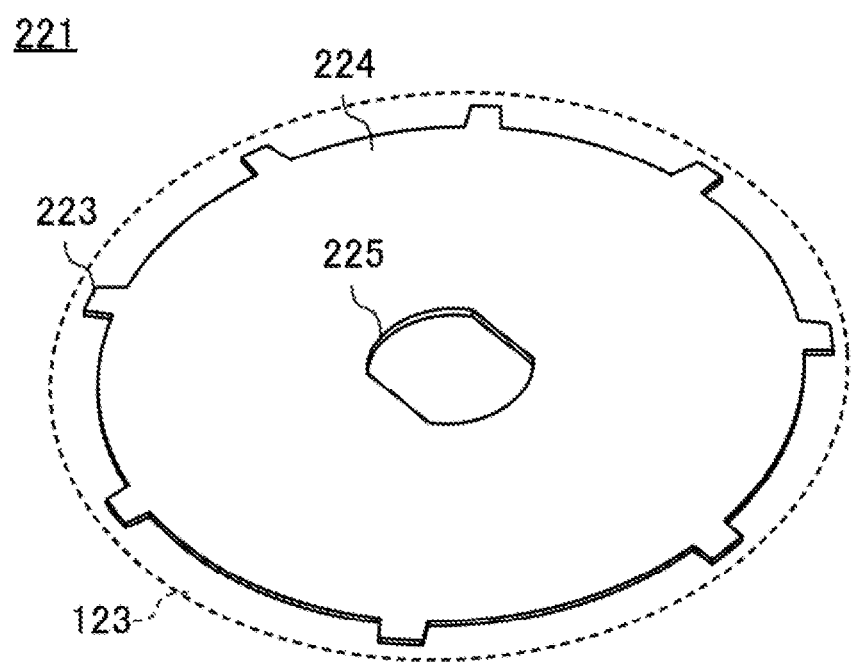
FIG. 8 is a perspective view of one blade plate 221.

FIG. 8 is a perspective view of the shape of one blade plate 221 in the second blade unit 220. The blade plate 221 is incorporated in the second blade unit 220, and is arranged farthest upstream in the grinding chamber 120, i.e. near the bottom portion in the drawing in the lower portion 123 of the grinding chamber 120 positioned on the side of the feed-in section 130 opposite the discharging section 140.

The blade plate 221 of the second blade unit 220 includes a plurality of blade fins 223 and a single disc portion 224. The blade fins 223 are arranged radially along the circumference of the disc-shaped disc portion 214. The disc portion 224 includes a non-circular engagement hole 225 at the center thereof, in the same manner as the disc portion 214 of the blade plate 211. In this way, when attached to the rotating shaft 110, the blade plate 221 rotates inside the grinding chamber 120 along with the rotating shaft 110 that is rotationally driven from the outer side of the grinding chamber 120.

In the blade plate 221, the ratio of the total diameter to the tip of a blade fin 223 occupied by the diameter of the disc portion 224 is large. Therefore, in the second blade unit 220, the ratio of the surface area of the second blade unit 220 to the horizontal cross section of the grinding chamber 120 including the second blade unit 220 is greater than this ratio for other blades. In this way, the material fed into the grinding chamber 120 can be restricted from falling below the second blade unit 220 shown in FIG. 6, and the yield of the dry powder obtained from the material to be processed can be improved.

As described above, the aperture rates of the blade plates are preferably greater closer to the discharging section 140. In this case, the ratio of the total diameter to the tip of a blade fin occupied by the diameter of the disc portion may be greater for blade plates closer to the discharging section 140. For example, the aperture rates of the blade plates 231, 211, and 241 are preferably greater than the aperture rate of the blade plate 221. It should be noted that the aperture rates of the blade plates 231, 211, and 241 may be approximately the same as each other.

Furthermore, the effect of the hot air blown in from the blowing section 150 transporting the material to be processed toward the discharging section 140 is weaker on the bottom side in the drawing of the second blade unit 220 in the grinding chamber 120, i.e. at the floor surface in the lower portion 123 of the grinding chamber 120 in FIG. 6. Accordingly, the material to be processed to be fed into the grinding chamber 120 is preferably not wrapped around on the upstream side of the second blade unit 220.

With reference to FIG. 6 again, the grinding chamber 120 includes an air supplying section 127, in the floor surface of the lower portion 123, that supplies high-pressure air, whose pressure is higher than the atmospheric pressure, to the inside of the grinding chamber 120. In this way, objects attempting to intrude below the second blade unit 220 are pushed out by the pressure between the inner surface of the grinding chamber 120 and the second blade unit 220 that is higher than the pressure within the grinding chamber 120. With such a configuration, the space between the inner surface of the lower portion 123 of the grinding chamber 120 and the tip of the second blade unit 220 is sealed by the high-pressure air, and the material to be processed is prevented from falling to the floor of the grinding chamber 120 from between the second blade unit 220 and the inner wall of the grinding chamber 120.

Furthermore, the dry grinding machine 100 further includes the fourth blade unit 240 attached to the rotating shaft 110. The fourth blade unit 240 includes a plurality of blade plates 241 stacked in the axial direction of the rotating shaft 110 and sandwiching spacers 242, and is arranged between the first blade unit 210 and the discharging section 140 in the axial direction of the rotating shaft 110.

In this way, the material to be processed that has been fed into the grinding chamber 120 from the feed-in section 130 and ground by the first blade unit 210 and the like is further ground by the fourth blade unit 240. The material to be processed that reaches the fourth blade unit 240 is ground into fine particles by the first blade unit 210 and the like to encourage drying. Accordingly, the material to be processed that is further ground by the fourth blade unit 240 becomes dry powder in which the particle diameters are fine and uniform.

In a case where the material to be processed is dry-powdered by the dry grinding machine 100 having the configuration described above, the material to be processed is fed into the hopper 160 in a state where the hot air is supplied to the grinding chamber through the feed-in section 130 and the blowing section 150. Furthermore, due to the operation of the feeder 170, the material to be processed within the hopper 160 is fed in near the bottom end of the tapered portion 122 of the grinding chamber 120, through the feed-in section 130.

When the dry grinding machine 100 is operated in the state shown in FIG. 6, i.e. a case where the dry grinding machine 100 is arranged vertically such that the rotating shaft 110 is substantially vertical, the material to be processed fed into the grinding chamber 120 is transported in the swirling flow of the hot air to rise up within the grinding chamber 120, and is ground into fine particles by the rotating first blade unit 210. Furthermore, drying of the material to be processed that has been ground into fine particles by the hot air is encouraged due to the increased surface area of the material to be processed. The material to be processed that has been ground into fine particles by the first blade unit 210 rises further within the grinding chamber 120 due to the swirling flow of the hot air, and is eventually ground into even finer particles by the rotating fourth blade unit 240. The material to be processed that has been ground into fine particles is discharged from the grinding chamber 120 through the discharging section 140, along with the hot air.

Furthermore, in a case where the material to be processed fed into the grinding chamber 120 from the feed-in section 130 is heavy due to not being dried, for example, the material to be processed falls downward inside the grinding chamber 120 to be ground by the rotating third blade unit 230. In this way, the surface area of the heavy material to be processed is increased to encourage drying by the hot air blown in from the blowing section 150, and therefore the material to be processed that has been made lighter by the drying rises together with the hot air inside the grinding chamber 120.

The material to be processed that has been ground into fine particles and made lighter by the drying is transported by the swirling flow of the hot air blown in from the blowing section 150, and is eventually ground into finer particles by the rotating first blade unit 210. Furthermore, the material to be processed that has been ground into finer particles by the first blade unit 210 rises further inside the grinding chamber 120 due to the swirling flow of the hot air, and is ground into even finer particles by the rotating fourth blade unit 240. The material to be processed that has been ground into even finer particles is discharged from the grinding chamber 120 through the discharging section 140, along with the hot air.

The dry powder of the material to be processed that has been discharged from the discharging section 140 along with the hot air is recovered using a classifier such as a cyclone and accumulated. Such a dry grinding machine 100 can be favorably used for creating dry powder of food products such as seeds, pulp, fruits, leaves, or the like derived from plants; meat, bone, skin, or the like derived from animals; or shells, fish meat, or the like derived from seafood. Furthermore, the dry grinding machine 100 can be used for dry-powdering wood chips serving as raw material for biomass fuel; hydrous solids such as sand, clay, peat, and lignite with high water content; and the like.

In the example described above, the fourth blade unit 240 arranged immediately before the discharging section 140 and the second blade unit 220 arranged farthest upstream in the grinding chamber 120 are included in addition to the third blade unit 230 arranged on the upstream side of the feed-in section 130 and the first blade unit 210 arranged on the downstream side of the feed-in section 130. However, various modifications of the blade unit arrangement in the dry grinding machine 100 can be thought of.

For example, in a case where it is possible to generate a sufficient swirling flow with the hot air blown in from the feed-in section 130, the blowing section 150 may be omitted. In this case, the lower portion 123 of the grinding chamber 120 can be shortened, and therefore a blade unit having the same structure as the second blade unit 220 may be arranged on the side of the feed-in section 130 opposite the first blade unit 210 in the axial direction of the rotating shaft 110.

In the case of such a structure as well, the space between the grinding chamber 120 and the blade unit having the same structure as the second blade unit may be sealed by the high-pressure air whose pressure is greater than the atmospheric pressure. Furthermore, for the blade plates of this blade unit, the ratio of the surface area of the blade unit in the cross section of the grinding chamber 120 including the blade unit may be greater than this ratio for other blades. With such a configuration, it is possible to reduce the height of the grinding chamber 120 by raising the floor surface of the grinding chamber 120, thereby reducing the height of the dry grinding machine 100 and making the dry grinding machine 100 smaller.

Furthermore, in a case where the dry grinding machine 100 is operated with a vertical arrangement as shown in FIG. 6, the material to be processed that has been sufficiently dried by being ground by the third blade unit 230 is ground into sufficiently fine particles by the first blade unit 210, and therefore the fourth blade unit 240 may be omitted. Furthermore, the material to be processed for which drying has been encouraged by the grinding by the third blade unit 230 becomes lighter, and therefore this material to be processed is prevented from falling to the floor portion of the grinding chamber 120. Accordingly, there are cases where the second blade unit 220 can also be omitted. In this way, in a case where some of the blade units are omitted, the height of the grinding chamber 120 can be reduced, such that the height of the dry grinding machine 100 is reduced.

Furthermore, the dry grinding machine 100 can be operated with a lateral arrangement, unlike the state shown in FIG. 6, such that the rotating shaft 110 is substantially horizontal. In this case, the material to be processed fed in from the feed-in section 130 does not fall to the floor portion side of the grinder chamber 120 even when this material to be processed is heavy due to not being dried, and therefore the third blade unit 230 and the second blade unit 220 may be omitted.

It should be noted that, in a case where the dry grinding machine 100 is used with a lateral arrangement, the material to be processed is fed in to the grinding chamber 120 from above, and if the fed material to be processed is heavy, e.g. if the water content of the material to be processed is high, if the dimensions of the material to be processed are large, or if the material to be processed is sticky, it is possible that the material to be processed will fall to the floor portion of the grinding chamber 120 and accumulate. Accordingly, although the dry grinding machine 100 can be used with a lateral arrangement, the vertical arrangement can be said to have a wider range of applicability for the material to be processed.

Embodiment Examples

Various materials to be processed were powdered using the dry grinding machine 100 described above. In the dry grinding machine 100 used here, the height of the entire grinding chamber 120 was 800 mm, and the heights of the upper portion 121 and the lower portion of the grinding chamber 120 were each 200 mm. Furthermore, the outer diameter of the blade plate 211 in the first blade unit 210 was 394 mm, and the outer diameter of the disc portion 214 was 200 mm. For each material experimented on, the operating conditions of the dry grinding machine 100 and an evaluation of the dry-powdered material to be processed are shown together in Table 1 below. Furthermore, in the case of a lateral arrangement, the raw material and hot air may be fed in from the blowing section 150, in which case the feed-in section 130 may be omitted or a portion of the hot air may be introduced to feed-in section 150. Furthermore, the 127 air supplying section may be either provided or omitted.

TABLE 1

| ITEM | | EMBODIMENT EXAMPLE 1 | EMBODIMENT EXAMPLE 2 | EMBODIMENT EXAMPLE 3 | EMBODIMENT EXAMPLE 4 | EMBODIMENT EXAMPLE 5 | EMBODIMENT EXAMPLE 6 |
|---|---|---|---|---|---|---|---|
| RAW MATERIAL NAME | | CARROT | SPINACH | ONION | GREEN BARLEY | BANANA | MANGO |
| RAW MATERIAL PRE-PROCESSING | | 5 mm DICING | 20 mm CUTTING AFTER DE-BRANCHING | ROUGH SLICING | 20 mm CUTTING AFTER DE-BRANCHING | RAW ROUGH SLICING | RAW ROUGH SLICING |
| RAW MATERIAL WATER CONTENT (%) | | 89 | 92 | 90 | 92 | 75 | 82 |
| EXCIPIENT ADDITIVE | | NOTHING | NOTHING | 10% POWDERED CELLULOSE | NOTHING | 10% POWDERED CELLULOSE | 10% POWDERED CELLULOSE |
| HOT WIND TEMPERATURE | | 200 | 200 | 200 | 200 | 180 | 180 |
| RAW MATERIAL FEED-IN AMOUNT (kg) | | 100 | 100 | 100 | 100 | 60 | 60 |
| RAW MATERIAL SUPPLY AMOUNT (kg/h) | | 25 | 20 | 25 | 20 | 20 | 20 |
| ROTOR ROTATION SPEED (rpm) | | 3.600 | 4.000 | 4.500 | 5.000 | 5.000 | 5.000 |
| ROTOR PERIPHERAL SPEED (TOPMOST PORTION) (m/s) | | 75 | 84 | 94 | 105 | 105 | 105 |
| DISCHARGE PORT TEMPERATURE (° C.) | | 90 | 90 | 90 | 85 | 85 | 85 |
| PRODUCT WATER CONTENT (%) | | 1.5 | 1.1 | 0.9 | 1.8 | 2.5 | 2.3 |
| PRODUCT MASS (kg) | | 10.2 | 7.5 | 17.5 | 7.3 | 18.8 | 15.0 |
| PRODUCT YIELD (%) | | 10.2 | 7.5 | 17.5 | 7.3 | 31.4 | 25 |
| PRODUCT AVERAGE PARTICLE DIAMETER (μm) | | 60 | 70 | 55 | 40 | 52 | 48 |
| FOOD PRODUCT BACTERIAL EXAMINATION | RAW MATERIAL GENERAL BACTERIA COUNT (NUMBER/g) | $5.4 \times 10^2$ | $2.0 \times 10^5$ | $1.5 \times 10^5$ | $3.2 \times 10^4$ | $3.2 \times 10^3$ | $7.7 \times 10^3$ |
| | RAW MATERIAL E. COLI | NEGATIVE | NEGATIVE | NEGATIVE | NEGATIVE | NEGATIVE | NEGATIVE |
| | PRODUCT GENERAL BACTERIA COUNT (NUMBER/g) | UNDER 300 | UNDER 300 | UNDER 300 | UNDER 300 | UNDER 300 | UNDER 300 |
| | PRODUCT E. COLI | NEGATIVE | NEGATIVE | NEGATIVE | NEGATIVE | NEGATIVE | NEGATIVE |
| ITEM | | EMBODIMENT EXAMPLE 7 | EMBODIMENT EXAMPLE 8 | EMBODIMENT EXAMPLE 9 | EMBODIMENT EXAMPLE 10 | EMBODIMENT EXAMPLE 11 | |
| RAW MATERIAL NAME | | TOFU REFUSE | HORSE MACKEREL (FISH) | CHICKEN BREAST MEAT | WOOD CHIPS | AUSTRALIAN LIGNITE | |
| RAW MATERIAL PRE-PROCESSING | | NOTHING | ROUGH SLICING AFTER 5 MINUTES BOILING | ROUGH SLICING AFTER 8 MINUTES BOILING | NOTHING | NOTHING | |
| RAW MATERIAL WATER CONTENT (%) | | 70 | 75 | 63 | 48 | 69 | |
| EXCIPIENT ADDITIVE | | NOTHING | NOTHING | NOTHING | NOTHING | NOTHING | |
| HOT WIND TEMPERATURE | | 220 | 180 | 200 | 150 | 160 | |
| RAW MATERIAL FEED-IN AMOUNT (kg) | | 100 | 60 | 50 | 100 | 200 | |
| RAW MATERIAL SUPPLY AMOUNT (kg/h) | | 25 | 25 | 25 | 50 | 30 | |

TABLE 1-continued

| | | | | | | |
|---|---|---|---|---|---|---|
| ROTOR ROTATION SPEED (rpm) | | 5.000 | 4.000 | 3.600 | 5.500 | 5.000 |
| ROTOR PERIPHERAL SPEED (TOPMOST PORTION) (m/s) | | 105 | 84 | 75 | 115 | 105 |
| DISCHARGE PORT TEMPERATURE (° C.) | | 90 | 85 | 80 | 50 | 50 |
| PRODUCT WATER CONTENT (%) | | 1.8 | 1.2 | 2.5 | 21 | 18.5 |
| PRODUCT MASS (kg) | | 27.2 | 14.1 | 15.5 | 58.5 | 58.8 |
| PRODUCT YIELD (%) | | 27.2 | 23.5 | 31 | 58.5 | 29.4 |
| PRODUCT AVERAGE PARTICLE DIAMETER (μm) | | 30 | 80 | 76 | 63 | 35 |
| FOOD PRODUCT BACTERIAL EXAMINATION | RAW MATERIAL GENERAL BACTERIA COUNT (NUMBER/g) | $3.5 \times 10^6$ | $6.8 \times 10^3$ | $3.4 \times 10^3$ | — | — |
| | RAW MATERIAL E. COLI | NEGATIVE | NEGATIVE | NEGATIVE | — | — |
| | PRODUCT GENERAL BACTERIA COUNT (NUMBER/g) | UNDER 300 | UNDER 300 | UNDER 300 | — | — |
| | PRODUCT E. COLI | NEGATIVE | NEGATIVE | NEGATIVE | — | — |

For each material to be processed described above, 2 to 7 hours were needed to dry-powder the entire fed-in amount of the material to be processed, as shown by the fed-in amounts of the materials to be processed and the supplied amounts of the materials to be processed recorded in Table 1, but with the dry grinding machine 100, it was possible to operate continuously until all of the fed-in materials were processed, without stopping the dry powdering to perform maintenance such as cleaning or adjustment. Furthermore, it was possible to reduce the additional amounts of excipients added to the materials to be processed having a particularly high water content.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

REFERENCE SIGNS LIST

100 . . . dry grinding machine; 110 . . . rotating shaft; 120 . . . grinding chamber; 121 . . . upper portion; 122 . . . tapered portion; 123 . . . lower portion; 124 . . . bearing; 125 . . . seal; 126 . . . thermal insulation material; 127 . . . air supplying section; 130 . . . feed-in section; 140 . . . discharging section; 150 . . . blowing section; 160 . . . hopper; 170 . . . feeder; 210 . . . first blade unit; 211, 221, 231, 241 . . . blade plate; 212, 222, 232, 242 . . . spacer; 213, 223 . . . blade fin; 214, 224 . . . disc portion; 215, 225 . . . engagement hole, 220 . . . second blade unit; 230 . . . third blade unit; 240 . . . fourth blade unit

What is claimed is:

1. A dry grinding machine comprising:
 a rotating shaft;
 a blade that is rotationally driven by the rotating shaft;
 a grinding chamber that includes a side wall surrounding an outer circumference of the blade and houses the blade;
 a heating apparatus configured to provide a hot air;
 a feed-in section configured to feed both the hot air from the heating apparatus and material to be processed, into the grinding chamber through a feed port of the side wall from a direction intersecting the rotating shaft; and
 a discharging section that is arranged on a side of the blade opposite the feed-in section, in an axial direction of the rotating shaft, and discharges from the grinding chamber, along with the hot air, the material to be processed that has been fed in from the feed-in section and then ground by the blade while being dried by the hot air, wherein
 the rotating shaft is centered in the grinding chamber,
 the grinding chamber has a portion where an inner diameter becomes larger closer to the discharging section in the axial direction, at least on the discharging section side of the blade, and
 the feed-in section is configured to feed the hot air from the feed port during the grinding by the blade, and is further configured to feed the material to be processed together with the fed hot air.

2. The dry grinding machine according to claim 1, wherein
 a position of the rotating shaft relative the grinding chamber is fixed in the axial direction, at both ends of the grinding chamber.

3. The dry grinding machine according to claim 1, wherein
 the grinding chamber includes a portion where an inner diameter is constant, in the axial direction, at each end in the axial direction.

4. The dry grinding machine according to claim 1, further comprising:
 a second blade arranged on a side of the feed-in section opposite the blade, in the axial direction; and
 an air supplying section configured to supply high-pressure air whose pressure is higher than an atmospheric pressure, into the grinding chamber, from a floor surface of the grinding chamber, wherein
a space between the second blade and the grinding chamber is sealed by the high-pressure air supplied by the air supplying section.

5. The dry grinding machine according to claim 4, wherein
a ratio of a surface area of one side of the second blade to a cross section area of the grinding chamber at which the second blade is positioned is greater than a ratio of a surface area of one side of the blade to a cross section area of the grinding chamber at which the blade is positioned.

6. The dry grinding machine according to claim 1, further comprising:
a blowing section that is arranged on a side of the feed-in section opposite the blade, in the axial direction, and blows hot air into the grinding chamber.

7. The dry grinding machine according to claim 6, wherein
the blowing section blows the hot air along a line tangent to the grinding chamber in a cross section orthogonal to the rotating shaft of the grinding chamber.

8. The dry grinding machine according to claim 6, further comprising:
a third blade arranged between the feed-in section and the blowing section, in the axial direction.

9. The dry grinding machine according to claim 8, wherein
the third blade is arranged downstream from the feed-in section in a direction of gravity.

10. The dry grinding machine according to claim 8, further comprising:
a second blade arranged on a side of the blowing section opposite the third blade, in the axial direction; and
an air supplying section configured to supply high-pressure air whose pressure is higher than an atmospheric pressure, into the grinding chamber, from a floor surface of the grinding chamber, wherein
a space between the second blade and the grinding chamber is sealed by the high-pressure air supplied by the air supplying section.

11. The dry grinding machine according to claim 10, wherein
a ratio of a surface area of one side of the second blade to a cross section area of the grinding chamber at which the second blade is positioned is greater than (i) a ratio of a surface area of one side of the blade to a cross section area of the grinding chamber at which the blade is positioned and (ii) a ratio of a surface area of one side of the third blade to a cross section area of the grinding chamber at which the third blade is positioned.

12. The dry grinding machine according to claim 1, further comprising:
a fourth blade arranged between the blade and the discharging section, in the axial direction.

13. The dry grinding machine according to claim 1, wherein
the feed-in section is configured to feed a food product which is transported by hot air, into the grinding chamber, and
the discharging section is configured to discharge from the grinding chamber, along with the hot air, the food product that has been fed in from the feed-in section and then ground by the blade while being dried by the hot air.

14. The dry grinding machine according to claim 1, wherein
the feed-in section is configured to feed any one of biomass fuel and a hydrous solid fuel including lignite which is transported by hot air, into the grinding chamber, and
the discharging section is configured to discharge from the grinding chamber, along with the hot air, the one of the biomass fuel and the hydrous solid fuel including lignite that has been fed in from the feed-in section and then ground by the blade while being dried by the hot air.

15. The dry grinding machine according to claim 1, wherein
the feed port is positioned along a line tangent to the side wall of the grinding chamber.

16. The dry grinding machine according to claim 1, wherein the hot air having a temperature range from 150° C. to 220° C. is supply into the grinding chamber.

* * * * *